Aug. 17, 1948.                F. W. ROWE                    2,447,280
                            TRAWLING WINCH
Filed Dec. 23, 1946                                   3 Sheets-Sheet 1
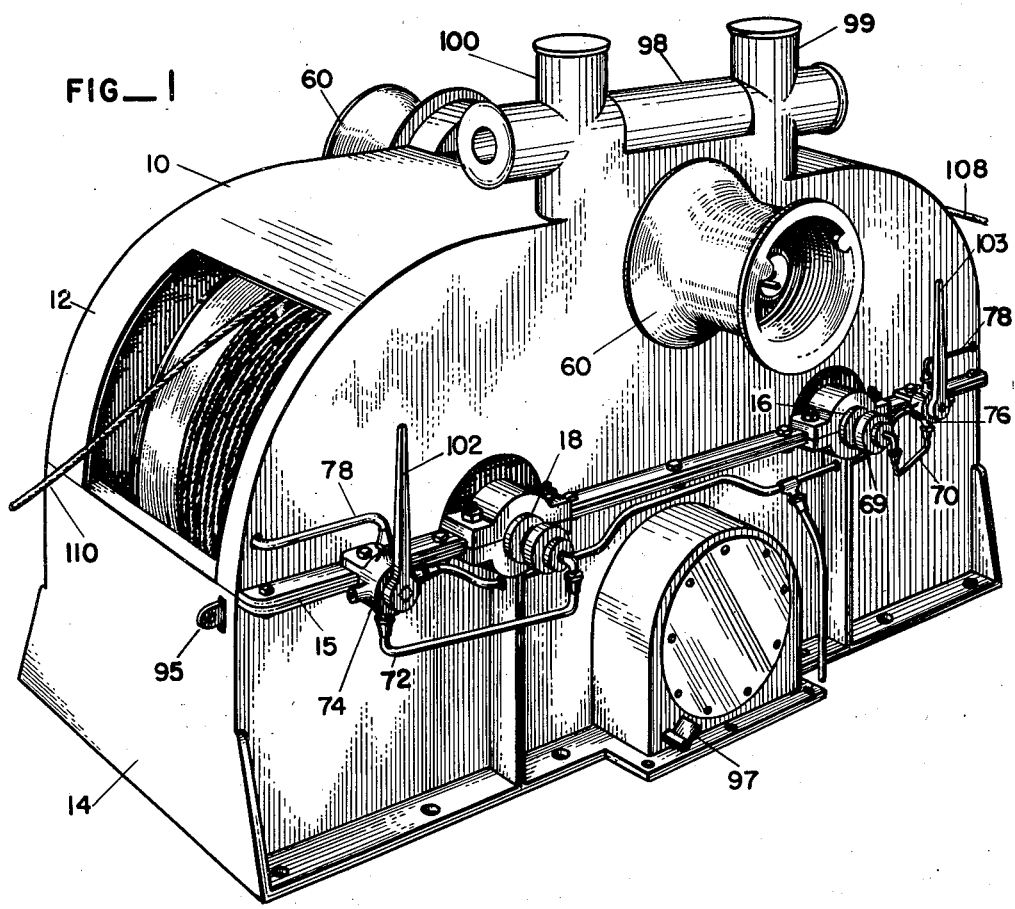
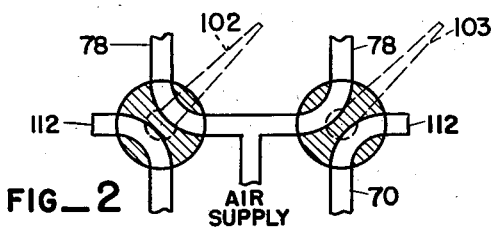
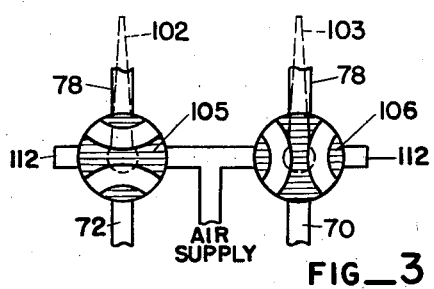
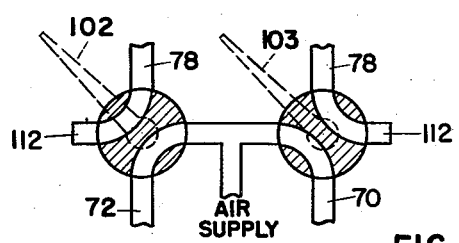
FRED W. ROWE
*INVENTOR.*
BY *Smith & Tuck*
ATTORNEYS

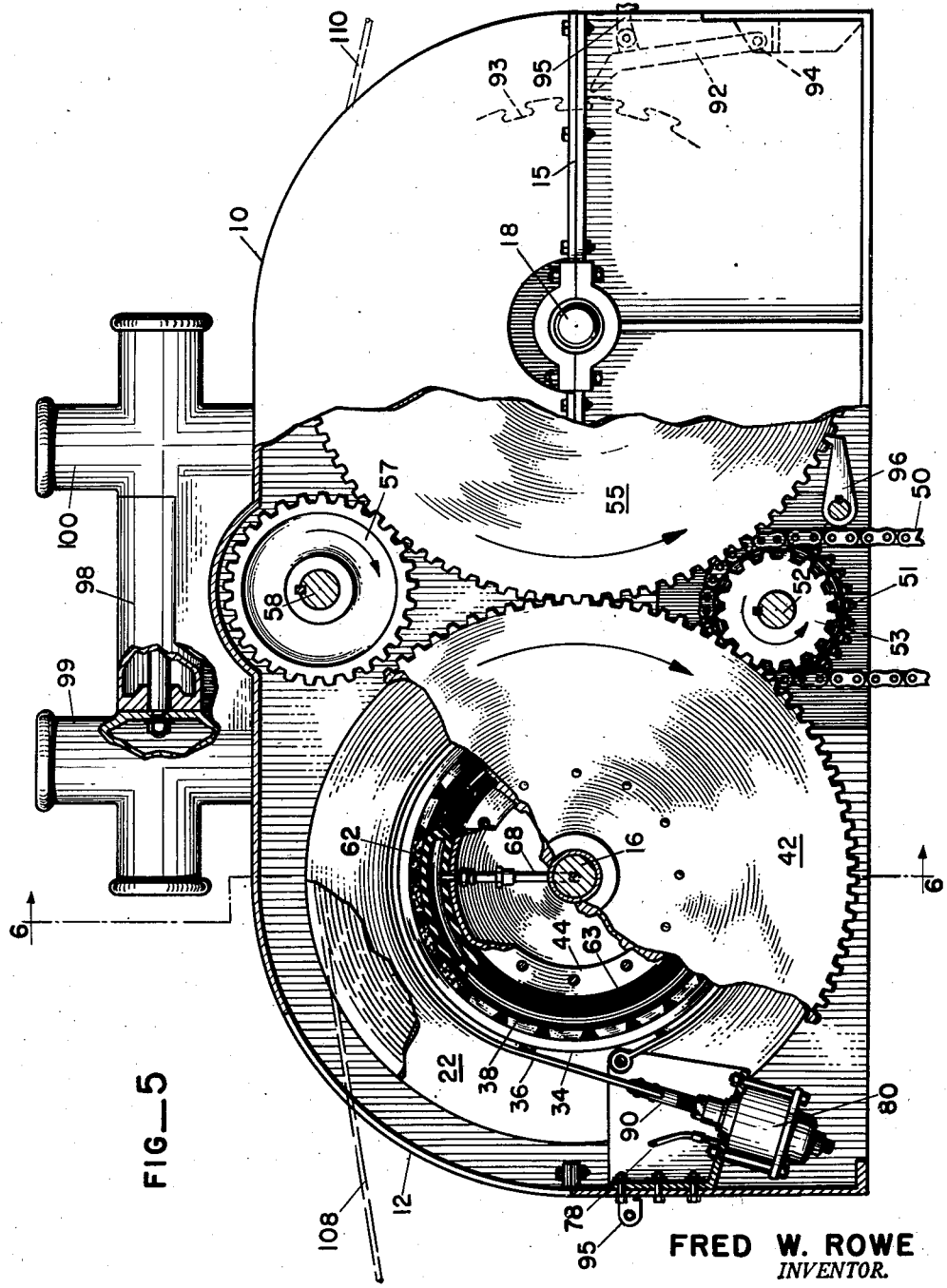

Aug. 17, 1948.     F. W. ROWE     2,447,280
TRAWLING WINCH
Filed Dec. 23, 1946     3 Sheets-Sheet 3
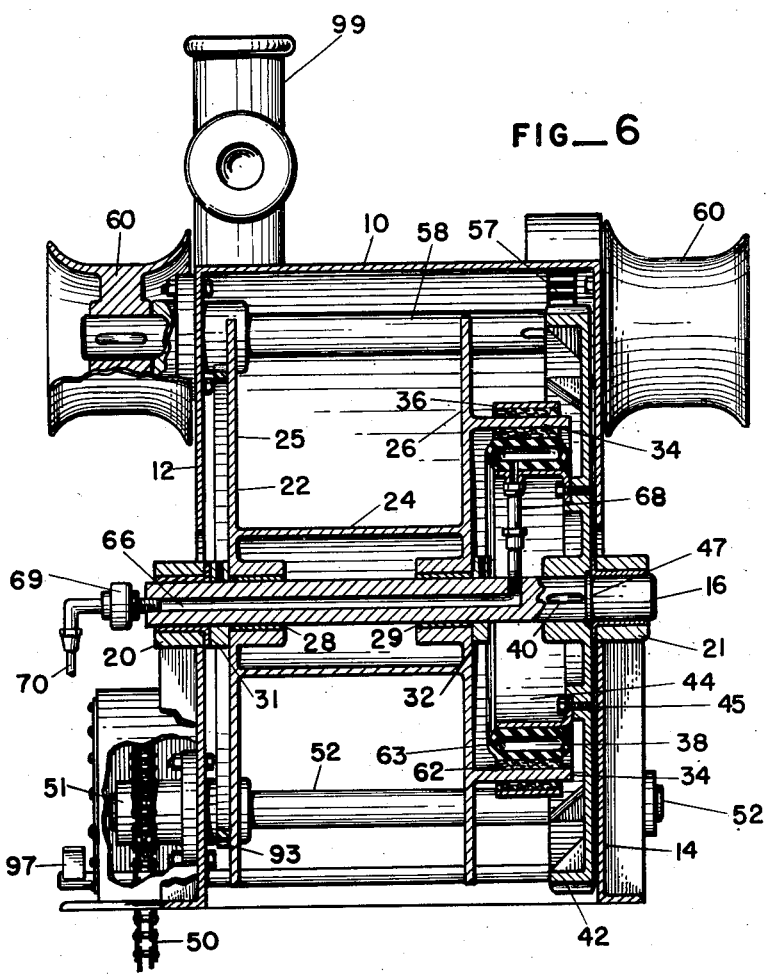
FIG_6
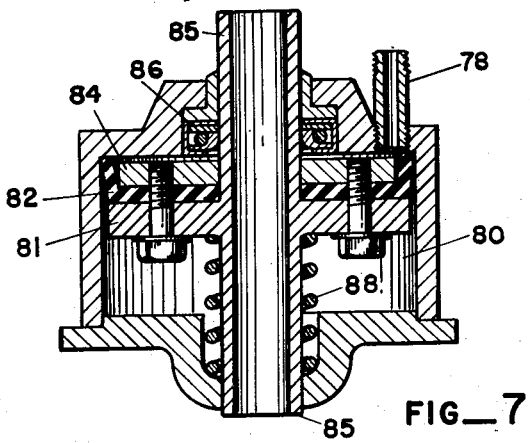
FIG_7
FRED W. ROWE
*INVENTOR.*
BY *Smith & Tuck*
ATTORNEYS

UNITED STATES PATENT OFFICE 2,447,280

TRAWLING WINCH

Fred W. Rowe, Seattle, Wash.

Application December 23, 1946, Serial No. 717,960

6 Claims. (Cl. 254—185)

My present invention relates to the general art of winch construction and, more particularly, to a trawling winch.

Commercial fishing boats, for a period beginning with the introduction of power, have been equipped with winches for winding cable, and as such, have also used them for hoisting and hauling.

A large number of different types of such winches have been provided from time to time, each with its own alleged special advantages, and too often perhaps, the builder of a new fishing boat, for instance, has to make his choice from the type of equipment which is available on the market. These winches have mechanical limitations, as a rule, and too often, require more than one man for their operation, or require skilled men, in that the majority of winches require skillful operation of the power clutching means and also of the braking means, which are independently operated. Consequently, the individual must learn from experience the nicety of timing, in order to make the winch truly workable.

My present winch is the result of a lifetime of study of the needs of fishermen, and I have provided a double-drum winch, which is capable of very simple control, and I have also provided that the operations of clutching and braking the individual drums can be performed so that the clutching means can not be engaged while the brake is set or, vice versa, the brake can not be set while the drum is connected to the power by the clutch. This saves a great deal of wear and tear on the equipment, besides making it capable of operation by an inexperienced person. It also prevents the serious damage that can be wrought upon a piece of equipment where it is possible to set a brake and apply power at the same time.

I have also considered the actual conditions of use in the construction of my winch, and have provided a winch of large cable capacity, which is made very largely of fabricated steel. This construction gives the maximum capacity for a minimum weight, so that the fisherman, instead of carrying about several tons of cast iron high on his deck, may now be relieved of the rolling tendency which high weights give to his boat, and at the same time, he can carry the difference in weight in pay-loads of fish, and the like.

I have further provided means whereby my winch will serve the myriad of purposes that arise in the operation of fishing craft, especially; and particularly have provided means for securing lines and spools or nigger-heads, upon which ropes may be wound under tension for the various purposes necessary about such craft.

I further provide that the clutching unit of my winch may take advantage of the extensible fluid-inflated clutch member, in order that a convenient fluid operation may be achieved and that such yieldable equipment may also save the shock loads that are often incidental to mechanical clutching.

The foregoing and other objects will be apparent, it is believed, from a study of the specification and the attached drawings, or may be comprehended, or are inherent in the same.

Referring to the drawings:

Fig. 1 is a perspective view showing a winch made after the teachings of my present invention;

Figures 2, 3, and 4 show the various selective settings of the valving means I employ to control my winch in its operation;

Fig. 5 is a side elevation of my winch with certain parts broken away to better illustrate the construction thereof;

Fig. 6 is an elevation, in section, substantially along the line 6—6 of Fig. 5;

Fig. 7 is a cross sectional view taken along the longitudinal axis of my fluid brake operating cylinder.

Referring more particularly to the disclosure in the drawings, throughout which like reference characters indicate like parts, the numeral 10 generally designates the housing for my winch. This I normally make in two parts, an upper or cover portion 12 and a lower or bed portion 14. These are joined together as by bolting the companion flanges at 15. As experience has shown that steel is preferable to cast iron or cast steel, due to its lightness and toughness and ability to yield slightly rather than break, I normally prefer to make these housings from rolled steel plate stock, welded together, and then, in order to provide long life under conditions at sea, the entire units are hot dipped galvanized inside and out. This type of structure gives a strong, light unit that can take tremendous strains without breakage, and which in turn permits the fisherman to carry the difference in weight between this light-weight construction and the conventional construction in pay-loads aboard his boat.

Disposed transversely in said housing, are the two main cable spooling drums and associated parts which are supported on the through shafts 16 and 18 respectively. These shafts are journaled in bearings 20 and 21. These bearings may have any desired friction surface, such as bronze or babbitt, or under certain conditions may employ anti-friction bearings. They are formed, preferably, by casting them of steel, so that the desired irregular conformation can be easily achieved and then, because they are of steel, they can be successfully welded to the steel plates which comprise the housing of my winch. It will be noted that both halves of the bearings, however, are secured to the lower housing member 14 so that if occasion requires, the entire upper housing member can be lifted off the winch, leaving the bulk of the working parts intact.

Each of the two drum assemblies are constructed substantially after the showing of Fig. 6, in which the main shaft 16 extends through the housing and is supported by the two bearings just described, 20 and 21. Disposed upon shaft 16, but in no way permanently connected thereto, is the cable spool or drum 22. This drum is provided with a center tubular core as 24, upon which the cable is wound, and the side plates 25 and 26, which support the cable and hold it in position as it is wound in depth upon the reel.

Spool 22 is provided with bearings at 28 and 29, so that it can revolve independently of shaft 16, which itself is a revolvable shaft. This construction is required for purposes which will be later described. In order to position drum 22 accurately upon shaft 16 I have provided the set collars 31 and 32 which, in effect, are spacers, but which being secured to shaft 16, as by set screws, definitely limit the longitudinal move- of drum 22 with respect to shaft 16.

One side plate 26 of reel 22 has an outwardly extending annular flange 34. This flange is machined on its inner and outer surfaces. On the outer surface I normally provide the band brake member 36, and on the inner surface I provide an extensible clutch engaging member 38.

Fixedly secured to shaft 16, as by the key shown at 40, is the driving gear 42. This gear, in addition to providing the power application means, serves as a support for the extensible clutch member by means of the inner flange element 44 of that member, which is secured as by bolting at 45 to the gear web. Gear 42 also co- acts to serve as a positioning means for shaft 16. The position of gear 42 on shaft 16 is partially positioned by the annular rim or ridge 47 formed as part of shaft 16. Then the gear, resting as it does against the frictional surface of bearing 21, prevents the movement of any of the clutching assemblies to the right as viewed in Fig. 6. Movement of the shaft to the left is prevented by set collar 31, which abuts bearing 20; and should this set collar loosen, set collar 32 will then accept this thrust loading and prevent longitudinal movement of the assembly.

The power application means will probably best be understood from a study of Fig. 5. The power is applied to the winch from an external primer mover, as by means of the roller chain 50, which is usually connected to the tail shaft of the main power plant, or it may be attached to a forward extension thereof, or to auxiliary power means, usually below deck. Chain 50 drives through sprocket 51 the power shaft 52. This shaft has keyed to it the driving pinion 53. Pinion 53 meshes with gear 42. The large gear 42 meshes directly with the drive gear 55 of the drum assembly which is supported on shaft 18. Gear 55 meshes with and drives gear 57 and thus drives shaft 58. Shaft 58 is journalled in the upper portion of the upper housing member and is nor- mally provided with rope or chain handling means.

Throughout my views I have shown the ordinary nigger head 60 used for the handling of rope. This shaft, however, provides means whereby the wildcat type of sheave for handling chain or any of the various types of sheaves or drums for handling small lines may be secured to it. It will be observed that as long as the power is being transmitted through chain 50 the large drive gears and shaft 58 are continuously being driven.

The extensible clutching means 38 is one of a type available on the market at this time, and consists of an inflatable tube 63, to the outside of which are permanently secured friction blocks as 62. On its inner side, the tube-like member, usually of rubber, is secured to a backing plate or rim 44, which rim, in turn, in my present application, is secured as described to the main driving gears, as 42 and 55. To energize, or inflate and deflate, the tube 63 I provide a rifle drill hole through shafts 16 and 18, as 66, and the pipe fitting at 68 communicating with the tube; this fitting, however, is fixedly attached to the metal supporting rim 44. This construction is probably best shown in Figs. 6 and, in part, in Fig. 5.

At the outboard end of shaft 16 I provide a revolvable transfer coupling at 69, so that the supply line 70 may be permanently connected to the coupling, which coupling must revolve with ample provision for taking care of the friction present, so that as the shaft revolves a portion of the coupling revolves with it but it does not tend to revolve and thus damage the permanently connected tube 70, as applied to shaft 16 and tube 72 as applied to shaft 18. These tubes lead to the fluid controllers, 74 and 76.

In order to provide braking effort, as in paying out trawls and the like, I have arranged that the brake band 36 be placed under tension by the air cylinder, probably best shown in Fig. 7. Air from the controllers 74 or 76 is led through tubes 78 to cylinder 80. Normally this is applied above the piston assembly, consisting of the reciprocable piston 81, a flexible piston cup 82, and a retaining disc for the cup 84. As part of the piston assembly, I provide the axially disposed tube 85 which, on its upper portion, is provided with a conventional type of packing and gland, as at 86, and at its lower end, tube 85 is provided with the compression spring 88, so arranged as to slack off the brake as soon as the air pressure is exhausted. With the structure shown, it is believed to be apparent that the brake band terminal bolt 90 may be adjusted to the best working tension by means of a lock nut threaded onto shaft 99 on either end of tube 85. It is to be understood that the braking means is duplicated for both drums.

Each drum is provided with a holding dog so that after a trawl has been lowered to the requisite depth, dog 92 may be engaged in the ratchet teeth 93 formed within the face of the drum side plate 25. Thus the drum can be held even though the main driving gears are in neutral or are turning. Dog 92 is pivoted at 94 and has an external link 95, to which any suitable operating means may be secured. Here again it is desired to point out that both of the drums have this dog assembly.

If for any reason it should be desirable to secure a line under tension to either of drums 60, it is necessary to have some means of locking these against rotation. Consequently, I have provided the gear locking dog 96, which can be operated by any convenient means, as by the external foot pedal 97. It will follow, it is believed, that by locking gear 55 with dog 96, gear 57 is also locked as it meshes with gear 55 and this locking will then secure shaft 58 and drums 60 against rotation. To add to the overall convenience of my winch, I have provided the dead roller at 98. The bit assembly, composed of members 99 and 100, can be used for snubbing lines or securing them. At the same time, by the use of roller 98, slack in the line can be taken up by means of the left hand drum 60, as viewed in Fig. 6.

Method of operation

In using my winch for its primary purpose of trawling, power is applied through chain 50 to shaft 52. This, through pinion 53, drives the gear 42, in turn driving gear 55, and through gear 55 driving the nigger head shaft 58. The easy control of my equipment will probably best be understood from a study of Figures 1 through 4.

In Figures 1 and 3, I have shown the control handles of controllers 74 and 76 as 102 and 103, respectively, in their neutral position. It will be noted from Fig. 3 that the connecting passageways contained within the revolvable valve members 105 and 106 are so turned that they prevent movement of fluid in any direction. In Fig. 2 I have shown a connection for both of the controllers wherein the supply line is connected to the brake cylinders 80. It is to be observed at this point, however, that there is no physical connection between the two controllers that will require them to work together or that will automatically work one if the other one is operated. Thus, the operator can use either one at will, or both, if he so desires.

In Fig. 4 the air supply line has been operatively connected to the revolvable connector 69 of each drive shaft 16 and 18, so that both of the drums will be revolved in the direction of the arrows shown in Fig. 5. Here again, the operator may selectively engage either one or both, as he desires. One of the valves might be in a neutral position, or with the brakes set, as shown in Fig. 2, without affecting the operation of the other drum. Assuming that air is supplied, as shown in Fig. 4, to the driving shaft through line 70, the first operation will be to gradually build up the air pressure within the extensible tube-like clutch member 63, and when sufficient pressure has been exerted, the clutch lining blocks 62 will be pressed against the flange 34; thus braking or, more specifically, clutching to any desired degree up to actual locking of the drum to the drive shaft may be achieved.

The operator can then, if he wishes, hold the clutches locked and thus impart the turning movement provided by gears 42 and 55 to the cable drums, so that cables 108 and 110 may be reeled in. For this operation of the clutching mechanism it should be clear that the extensible clutch will operate with either rotation of the driving gears. If it is desired to go from the reeling-in position to the holding position, the operator merely throws appropriate levers, as 102 or 103, over from the position shown in Fig. 4 to the position shown in Fig. 2. Under this circumstance, the air in extensible tube is permitted to exhaust out through exhaust ports 112 and air pressure is built up in pipe or tube 78 and the brake assembly as shown in Fig. 7 is set to hold the drums. If the holding is to be of temporary character, the operator can keep his air applied. If, however, it is going to be of considerable duration, he should then set dogs 92 so as to hold the drum, or drums, against paying out of cable.

While I have generally described the operation of the winch as used in trawling, it will be readily observed that it can be put to many other uses, and if used as a two-drum cargo winch operating on separate booms, the ease of operation will be readily apparent, particularly, when it is to be considered that the controllers 74 and 76 could, if desired, be grouped in the center of the machine where they will be within convenient reach of an operator who would then have a wonderful nicety of control over both of the drums and thus would be able to handle heavy cargo with ease.

It is believed that it will be clearly apparent from the above description and the disclosure in the drawings that the invention comprehends a novel construction of a trawling winch.

Having thus described my invention, I claim:

1. A winch, consisting of: a housing formed of lower and upper mating units, a revolvable shaft journaled within said lower housing member, a drive gear secured to said shaft, means for transmitting power from an outside source to said driving gear, a cable receiving spool revolvably journaled upon said drive shaft, side plates for said spool, an outwardly extending annular rim secured to one of said side plates and co-axial with said power shaft, an extensible friction member adapted for fluid inflation secured to said gear drive and adapted to have frictional engagement with the inner surface of said annular rim, an axial bore formed within said drive shaft and means for connecting said axial bore with said extensible friction member and means for supplying fluid under pressure to said bore.

2. A winch, consisting of: a housing formed of welded sheet steel having lower and upper mating units, a revolvable shaft journaled within said lower housing member, a drive gear secured to said shaft, means for transmitting power from an outside source to said driving gear, a cable receiving spool revolvably journaled upon said drive shaft, side plates for said spool, an outwardly extending annular rim secured to one of said side plates and co-axial with said power shaft, an extensible friction member adapted for fluid inflation secured to said drive gear and adapted to have frictional engagement with said annular rim, an axial bore formed within said drive shaft and means for connecting said axial bore with said extensible friction member and means for supplying fluid under pressure to said bore.

3. A winch, consisting of: a housing formed of lower and upper mating units, a revolvable shaft journaled within said lower housing member, a drive gear secured to said shaft, means for transmitting power from an outside source to said driving gear, a cable receiving spool revolvably journaled upon said drive shaft, side plates for said spool, an outwardly extending annular rim secured to one of said side plates and co-axial with said power shaft, an extensible friction member adapted for fluid inflation secured to said drive gear and adapted to have frictional engagement with said annular rim, an axial bore formed within said drive shaft and means for connecting said axial bore with said extensible friction member, means for supplying fluid under pressure to said bore, brake means disposed to selectively engage said annular rim, fluid operating means for said brake means and a single lever adapted to operatively control valve means for operating either said friction member or said brake means.

4. A winch, consisting of: a housing formed of lower and upper mating units, two revolvable shafts journaled within said lower housing member, drive gears secured to each of said shafts, means for transmitting power from an outside source to said driving gears, a cable receiving spool revolvably journaled upon each of said drive shafts, side plates for said spools, an outwardly extending annular rim secured to one of said side plates on each of said spools, and co-axial with the power shaft upon which the spool is mounted, an extensible friction member adapted for fluid inflation secured to each of said drive gears and adapted to have frictional engagement with the inner surface of said annular rims, an axial bore formed within each of said drive shafts, and means for connecting said axial bores with said extensible friction members and means for supplying fluid under pressure to said bores.

5. A winch, consisting of: a housing formed of welded sheet steel having lower and upper mating units, two revolvable shafts journaled within said lower housing member, drive gears secured to each of said shafts, means for transmitting power from an outside source to said driving gears, a cable receiving spool revolvably journaled upon each of said drive shafts, side plates for said spools, an outwardly extending annular rim secured to one of said side plates on each of said spools, and co-axial with the power shaft upon which the spool is mounted, an extensible friction clutch member adapted for fluid inflation secured to each of said drive gears and adapted to have frictional engagement with said annular rims, an axial bore formed within each of said, drive shafts, and means for connecting said axial bores with said extensible friction clutch members and means for supplying fluid under pressure to said bores.

6. A winch, consisting of: a housing formed of lower and upper mating units, two revolvable shafts journaled within said lower housing member, drive gears secured to each of said shafts, means for transmitting power from an outside source to said driving gears, a cable receiving spool revolvably journaled upon each of said drive shafts, side plates for said spools, an outwardly extending annular rim secured to one of said side plates on each of said spools, and co-axial with the power shaft upon which the spool is mounted, an extensible friction clutch member adapted for fluid inflation secured to each of said drive gears and adapted to have frictional engagement with said annular rims, an axial bore formed within each of said drive shafts, and means for connecting said axial bores with said extensible friction members, means for supplying fluid under pressure to said bores, fluid operated brake means for each of said spools, valve means for supplying fluid to the clutch member and brake means of each spool and a single control lever adapted to provide a neutral position or to energize at one time either the clutch member or the brake means.

FRED W. ROWE.

REFERENCES CITED

The following references are of record in the file of this patent:

UNITED STATES PATENTS

| Number | Name | Date |
|---|---|---|
| 1,298,956 | Johnson | Apr. 1, 1919 |
| 2,326,935 | Ferguson | Aug. 17, 1943 |
| 2,379,858 | Banzhaf et al. | July 10, 1945 |